Figure 1:
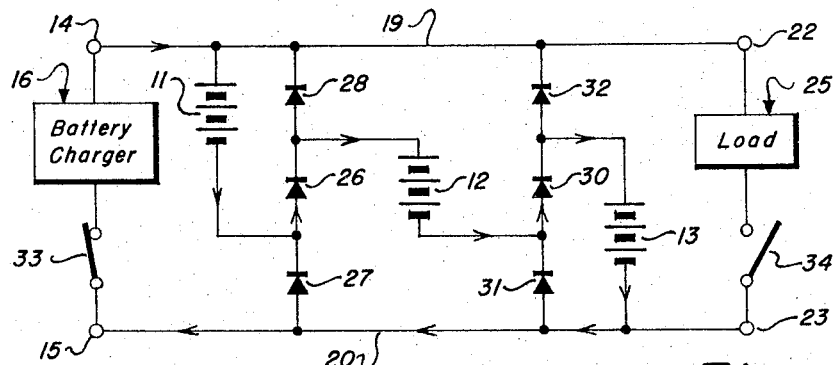

Nov. 15, 1966     J. B. NOE     3,286,152
MULTIPLE BATTERY CHARGING AND DISCHARGING CIRCUIT MEANS
Filed Oct. 10, 1963

INVENTOR.
John B. Noe
BY
Attorney

United States Patent Office 3,286,152
Patented Nov. 15, 1966

3,286,152
MULTIPLE BATTERY CHARGING AND
DISCHARGING CIRCUIT MEANS
John B. Noe, Albuquerque, N. Mex., assignor, by mesne assignments, to the United States of America as represented by the United States Atomic Energy Commission
Filed Oct. 10, 1963, Ser. No. 315,414
3 Claims. (Cl. 320—7)

The present invention relates generally to battery charging and discharging, and more particularly to a unique circuit arrangement capable of orienting a plurality of batteries in series for charging and in parallel for discharging.

In many electrical applications, such as, for example, electrically powered vehicles and telemetering systems, multiple batteries which are capable of being charged or recharged are often utilized to supply the electrical operating power. These batteries are normally used in parallel due to greater current output capabilities, but because of well known advantages are preferably charged in series, which, in many instances, gives rise to some difficulties. For example, in a telemetering system the batteries are often initially packaged and connected in parallel for use, but if the batteries require recharging a difficult and time consuming problem arises because of circuit rearranging necessary to place these batteries in series relationship.

Another difficulty or shortcoming of the previously known parallel battery "hook-ups" is that if one of the batteries is "bad," e.g., a dead cell in a storage battery, it may draw current from the others and thereby upset the operation of the system.

The present invention obviates or minimizes the noted and other difficulties and shortcomings heretofore encountered when using multiple batteries so arranged as to be discharged in parallel and charged in series by providing a novel circuit capable of automatically connecting the batteries in series for charging and in parallel for discharging.

An object of the present invention is to provide a new and improved battery charging and discharging circuit of relatively simple and inexpensive construction.

Another object of the present invention is to provide a novel battery circuit where the "switching" from series charging to parallel discharging is attained without rearranging the circuit.

A further object of the present invention is to provide a multiple battery charging and discharging arrangement on a single line.

A still further object of the present invention is to place a number of unidirectional devices, e.g., diodes, in a multiple battery circuit such that the diodes orient the batteries in series for charging and then in parallel for discharging.

Other and further objects of the invention will be obvious upon an understanding of the illustrative embodiments about to be described, or will be indicated in the appended claims, and various advantages not referred to herein will occur to one skilled in the art upon employment of the invention in practice.

Two embodiments of the invention have been chosen for purposes of illustration and description. The embodiments illustrated are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 2:
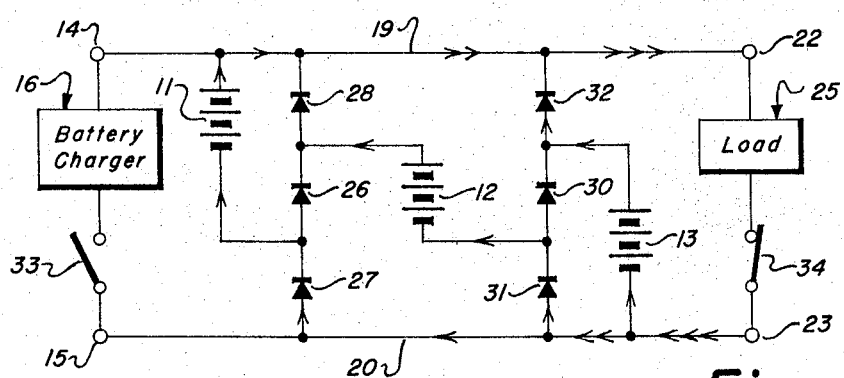
Figure 3:
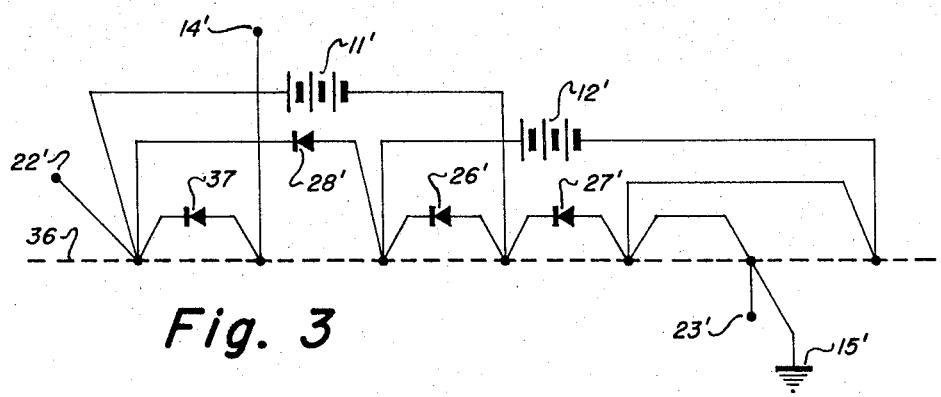

In the accompanying drawings:
FIG. 1 is a diagrammatic view of one form of the present invention showing current flow path during charge;
FIG. 2 is a diagrammatic view similar to FIG. 1 but showing current flow path during discharge; and
FIG. 3 is a diagrammatic view illustrating another arrangement of an electrical circuit embodying the present invention.

Referring to FIGS. 1 and 2 there are shown three batteries 11, 12 and 13 which are serially coupled to each other and to terminals 14 and 15 of a battery charger generally indicated at 16. These batteries, which may be of any chargeable type having wet or dry cells and of any desired capacity, are preferably oriented with the positive terminal of each battery disposed towards terminal 14 so that a direct current from the charger 16 may pass through the batteries in a seriatim manner to the ground or common terminal 15.

The terminals 14 and 15 of the charging system are shown coupled by conductors 19 and 20 to output or discharging terminals 22 and 23 respectively. These output terminals may, in turn, be coupled to any desired load, such as an electrical motor or an electronic system, as generally indicated at 25.

Between each pair of adjacent batteries such as between batteries 11 and 12 there is disposed at least one unidirectional device, for example a diode, as indicated at 26. For the purpose of discussion, the unidirectional devices 26 will be hereinafter referred to as diodes, but are not necessarily limited to such since other types of unidirectional devices, e.g., rectifiers, may be used. This device or diode 26 enables the charging current to flow from battery 11 into battery 12, but prevents current flow in the opposite direction during discharge of battery 12. On each side of diode 26 there is shown another diode, such as indicated at 27 and 28, which diodes in turn, may be coupled to conductors 19 and 20 respectively. The leads from the negative terminal of battery 11 and the positive terminal of battery 12 are preferably coupled between diodes 26 and 27 and 26 and 28 respectively, such that the charging current is prevented by diode 27 from reaching the ground or common terminal 15 while the diode 28 functions to prevent the charging current in line 19 from entering the batteries in a parallel flow.

These diodes 26–28 and the diodes hereinafter referred to may be solid state type diodes, e.g., germanium or silicon diodes, or tube type diodes of any desired voltage and amperage. The diodes such as 26 having the charging current passing therethrough preferably have higher voltage and lower amperage ratings than the diodes such as 27 and 28 in the discharging circuit.

In a system where more than two batteries are used such as shown in FIGS. 1 and 2, a diode arrangement similar to the diode arrangement between batteries 11 and 12 is also preferably placed between batteries 12 and 13. These diodes 30, 31 and 32 correspond to and function in a manner similar to diodes 26, 27 and 28 respectively. It will be understood that while the diagrammatic or schematic embodiment disclosed in FIGS. 1 and 2 shows a three battery charging and discharging arrangement in accordance with the present invention, any desired number of batteries greater than two may be placed in a circuit as disclosed herein.

When charging batteries 11, 12 and 13 as shown in FIG. 1, the battery charge 16 may be coupled to the terminals 14 and 15 in any suitable manner such as by closing a switch 33. The charging curent flows successively from terminal 14 through batteries 11, 12 and 13 to terminal 15 as indicated by the arrows. Normally during battery charging the load 25 is disconnected from the battery circuit such as by open switch 34. The charger 16 may be cut-off upon charging the batteries or at any other desired time by opening the switch 33 or by other suitable means. However, in some instances the charger 16 may remain coupled to the batteries until the load 25 draws current from the batteries as will be hereinafter described.

In FIG. 2 the switch 34 is shown closed for coupling the batteries to the load 25. This load, in turn, normally draws a significant amount of current from the batteries such as to "switch" the current flow from a series in a parallel current flow arrangement for discharging. During discharge the switching and the resulting parallel current flow through the batteries is accomplished by the novel diode placement. For example, the proportional flow through the batteries 11, 12 and 13 is indicated by the arrows in FIG. 2 with the current flowing through— say battery 12, from the ground or common terminal 23 and sequentially through diode 31, battery 12, diode 28, conductor 19 and thence through terminal 22 into the load 25. During this flow the discharge in series through the batteries is prevented by diodes 26 and 30 which assure that the battery discharge current retains its parallel flow characteristics.

In some instances, as mentioned above, the battery charger 16 may remain coupled to the batteries such as when the batteries are designed to continuously handle a certain charging amperage or where minor systems in the load 25 are functioning during the charge of the batteries for enabling the charger 16 to supply the operating current to these minor systems. In instances when a significant load is applied to the batteries while the charger 16 is functioning, the amperage drawn from the batteries by the load is usually much greater than that supplied to the batteries from the charger 16, thus causing the current flow through the batteries to automatically switch from series charging to parallel discharging. Normally, the charger 16 is inactivated substantially concurrently with or shortly after coupling the load 25.

The particular arrangement shown in FIGS. 1 and 2 is primarily directed to what might be referred to as "single line charging and discharging" in that the charge and discharge paths are both common to the same conductors. With this type arrangement, it is preferable to use diodes 28 and 32 to prevent parallel charging. However, if the conductors connected to diodes 28 and 32 were not common to both the charger and the load then the diodes 28 and 32 may be eliminated.

In FIG. 3 there is also shown a single line charge and discharge arrangement somewhat similar to the embodiment of FIGS. 1 and 2. Therefore, the reference characters used in FIG. 3 will be the same as those used in the FIGS. 1 and 2 except for prime marks (') where the indicated component corresponds to a like component in FIGS. 1 and 2. The dotted line 36 may be representative of a printed circuit board, panel, or the like with the points shown on the line 36 corresponding to suitable terminals such as pins, solder joints, etc. An additional diode 37 may be positioned between terminal 14' and battery 11' for preventing discharge current from entering the charger when the battery output load is applied prior to disengaging the charger 16'. This diode 37 may also be utilized for charging the batteries with an alternating current source in that the diode 37 permits passage of only the positive phase of the charging current. However, when using alternating current for charging and, of course, depending upon the particular type of batteries being charged, it may be desirable to place a shunt including a suitable capacitance (not shown) between a point beyond the diode 37 and ground to smooth out the charging pulses.

The embodiment illustrated in FIG. 3 operates in a manner similar to the arrangement shown in FIGS. 1 and 2 except for the quantity of batteries being used.

It will be seen that the present invention sets forth a novel circuit where any desired plurality of batteries or individual cells of a multiple cell battery may be charged in series and automatically switched to discharge in parallel. Also if one of the batteries is "bad," it cannot draw current from the others due to diode arrangement.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. Apparatus for operatively orienting batteries in series during charging and in parallel during discharging comprising in combination, battery charging means, electrical load means, first conductor means including a pair of conductors for connecting the charging means and the load means electrically in parallel, second conductor means interconnecting said pair of conductors intermediate the battery charging means and the electric load means and including a first diode, a second diode, and a third diode, each of which is serially connected in the second conductor means to provide unidirectional flow of current through said second conductor means, a first battery connected to one of said pair of conductors and connected to the second conductor means intermediate said first diode and said second diode, a second battery connected to the other of said pair of conductors and connected to said second conductor means intermediate said second diode and said third diode, and first and second means to selectively couple and uncouple the battery charging means and the electrical load means to the first conductor means.

2. The apparatus of claim 1 in which the second battery is connected to the other of said pair of conductors by a third conductor means and said third conductor means interconnects said pair of conductors and includes a first diode, a second diode, and a third diode, each of which is serially oriented with respect to the others for the unidirectional flow of current through said third conductor means, and the flow of current through said third conductor is parallel to the flow of current in the second conductor means and the second battery is connected to the third conductor means intermediate said first and said second diode.

3. The apparatus of claim 2 including a third battery connected to the other of said pair of conductors and to the third conductor means intermediate said second and said third diode.

References Cited by the Examiner
UNITED STATES PATENTS 3,207,966 9/1965 Parkinson _____ 320—5 X
3,241,029 3/1966 Slomski _____ 320—40

JOHN F. COUCH, *Primary Examiner.*

S. WEINBERG, *Assistant Examiner.*